(12) United States Patent
Kleinguetl et al.

(10) Patent No.: US 11,091,965 B2
(45) Date of Patent: Aug. 17, 2021

(54) USING A LIQUEFIED GAS AS A CENTRIFUGE AID

(71) Applicant: Halliburton Energy Services, Inc., Houston, TX (US)

(72) Inventors: Kevin G. Kleinguetl, Kingwood, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 631 days.

(21) Appl. No.: 15/774,075

(22) PCT Filed: Oct. 9, 2017

(86) PCT No.: PCT/US2017/055719
§ 371 (c)(1),
(2) Date: May 7, 2018

(87) PCT Pub. No.: WO2019/074472
PCT Pub. Date: Apr. 18, 2019

(65) Prior Publication Data
US 2019/0106953 A1 Apr. 11, 2019

(51) Int. Cl.
*E21B 21/06* (2006.01)
*B04B 1/20* (2006.01)
(Continued)

(52) U.S. Cl.
CPC .......... *E21B 21/065* (2013.01); *B01D 21/262* (2013.01); *B04B 1/20* (2013.01);
(Continued)

(58) Field of Classification Search
CPC ....... E21B 21/065; E21B 21/066; B04B 1/20; B04B 11/02; B04B 5/10; B04B 15/00; B01D 21/262; B01D 21/267
(Continued)

(56) References Cited

U.S. PATENT DOCUMENTS 4,434,028 A * 2/1984 Eppig ................ B01D 11/0203
196/14.52
6,328,118 B1 12/2001 Karigan et al.
(Continued)

FOREIGN PATENT DOCUMENTS

WO 03063998 A1 8/2003

OTHER PUBLICATIONS

International Searching Authority, International Search Report and Written Opinion, International application No. PCT/US17/55719 , which is a PCT parent to the instant application, dated Mar. 12, 2018.

*Primary Examiner* — Walter D. Griffin
*Assistant Examiner* — Shuyi S. Liu
(74) *Attorney, Agent, or Firm* — Tenley Krueger; C. Tumey Law Group PLLC

(57) ABSTRACT

Extracting and separating solid particulates from a drilling fluid includes combining a stream of drilling fluid containing solid particulates with a liquefied gas to form a mixture having a reduced viscosity and/or density. The mixture enters a centrifugal separator at a pressure sufficient to keep the liquefied gas in a liquid phase where rotational forces promote the separation of at least a portion of the solid particulates from the mixture. At least a portion of the solid particulates are removed to form a fluid stream having reduced solids content. In embodiments the liquefied gas can be selected from the group consisting of an inert gas, an alkane gas, an alkene gas, an alkyne gas, a noble gas, and combinations thereof. The liquefied gas can be removed from the fluid stream after the centrifugal separator and recycled back to be mixed with the stream of drilling fluid containing solid particulates.

19 Claims, 5 Drawing Sheets

(51) Int. Cl.
*B04B 11/02* (2006.01)
*B04B 5/10* (2006.01)
*B01D 21/26* (2006.01)
*B04B 15/00* (2006.01)

(52) U.S. Cl.
CPC ............... *B04B 5/10* (2013.01); *B04B 11/02* (2013.01); *B04B 15/00* (2013.01); *E21B 21/066* (2013.01); *B01D 21/267* (2013.01)

(58) Field of Classification Search
USPC ........................................ 196/14.52; 202/168
See application file for complete search history.

(56) References Cited

U.S. PATENT DOCUMENTS

| | | |
|---|---|---|
| 7,897,050 B2 | 3/2011 | Waibel et al. |
| 8,048,304 B2 | 11/2011 | Waibel et al. |
| 2004/0124014 A1 | 7/2004 | Cordova |
| 2016/0160612 A1 | 6/2016 | Kuznetz et al. |
| 2017/0014836 A1* | 1/2017 | Fisher .................... B04B 11/02 |
| 2017/0232365 A1 | 8/2017 | Phillips et al. |
| 2018/0193775 A1* | 7/2018 | Ross ..................... E21B 21/068 |
| 2019/0063172 A1* | 2/2019 | Ross ........................ B04B 1/20 |

\* cited by examiner

USING A LIQUEFIED GAS AS A CENTRIFUGE AID

BACKGROUND

Hydrocarbon producing wells include wellbores that are typically drilled at selected locations into subsurface formations in order to produce hydrocarbons. A drilling fluid, which can also be referred to as "mud," is used during drilling of the wellbores. Drilling fluid serves several purposes, such as cooling of the drill bit, carrying cuttings to the surface, providing pressure to maintain wellbore stability and prevent blowouts, and the sealing off of the wellbore.

Drilling fluids can be formulated in a number of ways. A drilling fluid typically comprises water and/or oil as a base fluid, with solids in suspension. A non-aqueous based drilling fluid typically contains oil or synthetic fluid as a continuous phase and may also contain water dispersed in the continuous phase by emulsification so that there is no distinct aqueous layer in the fluid. Such a dispersion is generally referred to as an invert emulsion, water-in-oil emulsion, or oil based mud (OBM). OBM in the context herein should be understood to include synthetic-based oleic muds or natural based oleic muds, where non-aqueous liquids are part of the base fluid.

The separation of solids from the drilling fluids can include physical separation techniques such as shale shakers, screens, inclined plate settlers (sometimes referred to as lamella clarifiers), centrifuges, and hydro-cyclones. Attempts to increase efficiency of the separation include increasing the g forces of centrifuges, and hydro-cyclones, dilution to decrease viscosity and mud weight, and the addition of chemicals to decrease viscosity and mud weight and/or to increase particle diameter. Each of these various techniques has advantages and disadvantages to their implementation. Disadvantages can include increased costs, additional processing steps, and negatively affecting the mud system. Some require processing steps that do not allow for continuous processing, instead using batch processing or requiring batch centrifugation. Batch processing is generally not as efficient as continuous processing.

There is therefore a need for systems and methods that provide economically efficient systems for extracting solid materials from a drilling mud.

BRIEF DESCRIPTION OF THE DRAWINGS

The accompanying views of the drawing are incorporated into and form a part of the specification to illustrate several aspects and examples of the present invention, wherein like reference numbers refer to like parts throughout the figures of the drawing. These figures together with the description serve to explain the general principles of the invention. The figures are only for the purpose of illustrating examples of how the various aspects of the invention can be made and used and are not to be construed as limiting the invention to only the illustrated and described examples. The various advantages and features of the various aspects of the present invention will be apparent from a consideration of the drawings.

DETAILED DESCRIPTION

Figure 1:
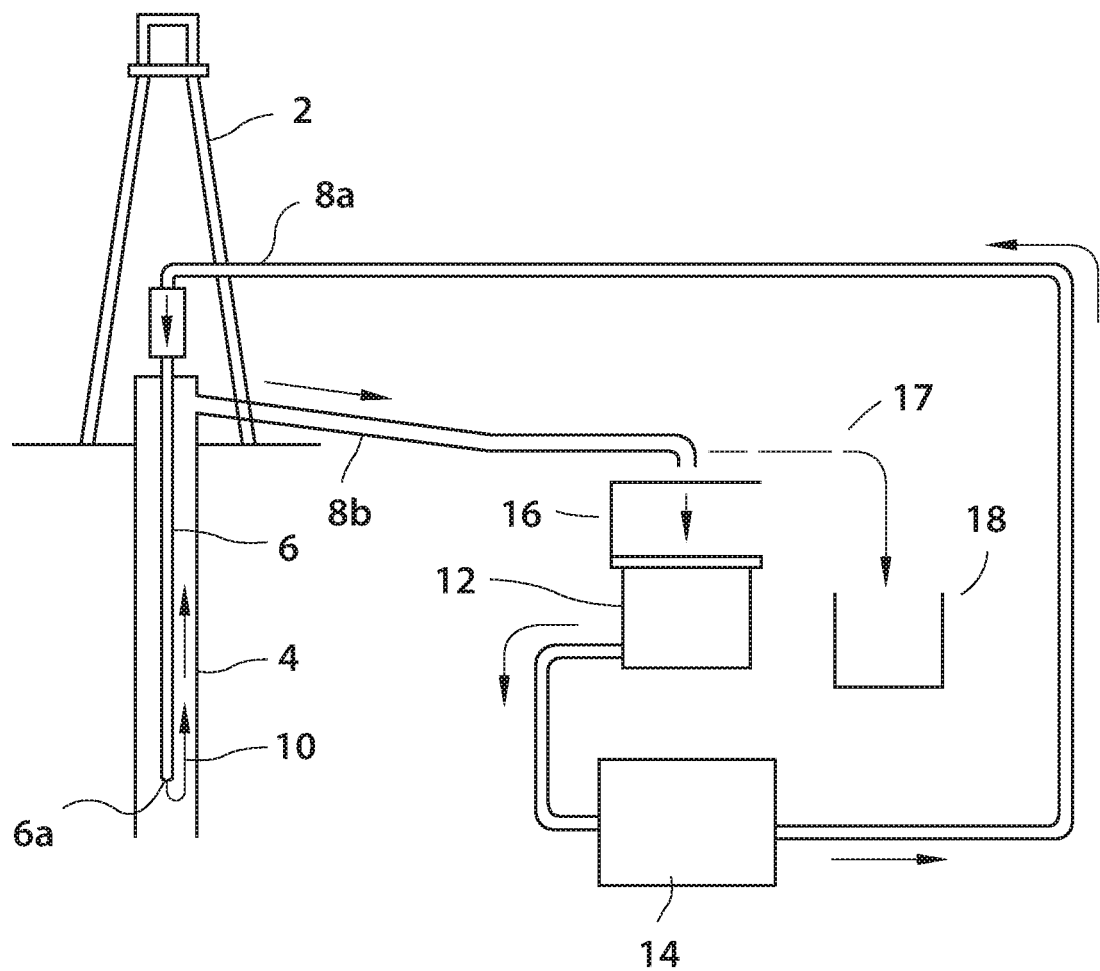
FIG. 1 is an illustrative schematic of a mud system used in drilling a wellbore.

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

The present disclosure relates generally to wellbore drilling operations. More particularly, the present disclosure relates to methods of removing solids from a drilling fluid which can lead to improved maintenance of drilling fluids. Embodiments of the present disclosure provide a method to continuously extract particulate solids from a drilling fluid in a manner to increase the efficiency of the current solids removal equipment while not negatively affecting the mud system.

Oilfield drilling fluid, often called "mud," serves multiple purposes in the industry. Among its many functions, the drilling mud acts as a lubricant to cool rotary drill bits and facilitate faster cutting rates. The mud is mixed at the surface and pumped downhole through a bore of the drill string to the drill bit where it exits through various nozzles and ports, lubricating and cooling the drill bit. After exiting through the nozzles, the "spent" fluid returns to the surface through an annulus formed between the drill string and the drilled wellbore.

Furthermore, drilling mud provides a column of hydrostatic pressure, or head, to provide hydrostatic pressure on the walls of the drilled borehole so as to prevent wellbore collapse and the resulting influx of gas or liquid from the formations being drilled. This hydrostatic pressure offsets formation pressures thereby preventing fluids from flowing into the wellbore if pressurized deposits in the formation are encountered. Two factors contributing to the hydrostatic pressure of the drilling mud column are the height (or depth) of the column (i.e., the vertical distance from the surface to the bottom of the wellbore) and the density (or its inverse, specific volume) of the fluid used. Various weighting and lubrication agents are mixed into the drilling mud to obtain the right mixture for the type and construction of the formation to be drilled. Increasing the amount of weighting agent(s) dispersed in the mud base will generally create a heavier drilling mud. Drilling mud that is too light may not protect the formation from fluid influx and possible blowouts, and drilling mud that is too heavy may over invade the formation and possibly cause formation damage in a potentially productive zone. Therefore, it can be important to precisely know the characteristics and chemical composition of such drilling fluids and much time and consideration is spent to ensure the mud mixture is optimal. Because the mud evaluation and mixture process is time consuming and expensive, drillers and service companies prefer to reclaim the returned drilling mud and recycle it for continued use. In order to optimize the performance of a drilling fluid during drilling operations, the physical and chemical properties of the drilling fluid and its component parts must be carefully monitored and controlled.

Another significant purpose of the drilling mud is to carry the cuttings away from the drill bit to the surface. As a drill bit pulverizes or scrapes the rock formation at the bottom of the borehole, small pieces of solid material are left behind. The drilling fluid exiting the nozzles at the bit stir up and carry the solid particles of rock and formation to the surface within the annulus between the drillstring and the borehole. Therefore, the fluid exiting the borehole from the annulus is a slurry of formation cuttings in drilling mud, and the cutting particulates must be removed before the mud can be recycled.

One type of apparatus used to remove cuttings and other solid particulates from drilling mud is commonly referred to in the industry as a "shale shaker." A shale shaker, also known as a vibratory separator, is a vibrating sieve-like table upon which returning used drilling mud is deposited and through which substantially cleaner drilling mud emerges. Typically, the shale shaker is an angled table with a generally perforated filter screen bottom. Returning drilling mud is deposited on the top of the shale shaker. The fluid falls through the perforations to a reservoir below thereby leaving any solid particulate material larger than the perforations behind. The combination of the angle of inclination with the vibrating action of the shale shaker table enables the solid particles left behind to flow until they fall off the end of the shaker table.

The amount of vibration and the angle of inclination of the shale shaker table are adjustable to accommodate various drilling mud flow rates and particulate percentages in the drilling mud. After the fluid passes through the perforated bottom of the shale shaker, it may pass through one or more additional piece of equipment (e.g., a centrifuge, a hydro-cyclone, a desilter, a desander) to remove smaller cuttings and/or particulate matter.

As used herein, the term "fluid" refers to any substance that is capable of flowing, including particulate solids, liquids, gases, slurries, emulsions, powders, muds, mixtures, combinations thereof, and the like. In some embodiments, the fluid may be a drilling fluid or drilling mud, including water-based drilling fluids, oil-based drilling fluids, synthetic drilling fluids, and the like. In other embodiments, the fluid may be a completion fluid or clean-up fluid such as, but not limited to, fresh water, saltwater (e.g., water containing one or more salts dissolved therein), brine (e.g., saturated salt water, chloride salts, bromide salts, combinations thereof, etc.), seawater, a spacer fluid, base fluids, or other treatment fluids known in the art.

As used herein, the term "characteristic" refers to a chemical, mechanical, or physical property of a component or a substance, such as a fluid, or a component within the fluid. A characteristic of a substance may include a quantitative value of one or more chemical constituents therein or physical properties associated therewith. Illustrative characteristics of a substance that can be monitored can include, for example, chemical composition (e.g., identity and concentration in total or of individual components), phase presence (e.g., gas, oil, water, etc.), contained solids, pH, alkalinity, viscosity, density, and the like.

As used herein, the term "flow path" refers to a route through which a fluid is capable of being transported between at least two points. In some cases, the flow path need not be continuous or otherwise contiguous between the two points. Exemplary flow paths include, but are not limited to, a flow line, drill string, work string, casing, a wellbore, an annulus defined between a wellbore and any tubular arranged within the wellbore, a mud pit, etc., combinations thereof, or the like. It should be noted that the term "flow path" does not necessarily imply that a fluid is flowing therein, rather that a fluid is capable of being transported or otherwise flowable therethrough.

As used herein, the term "gas" refers to a material that exists in the vapor phase at standard temperature and pressure. Standard temperature and pressure is defined to be 25° C. and 1 atmosphere, respectively.

As used herein, the term "super-ambient pressure" refers to a pressure above the pressure at ambient conditions. The pressure at ambient conditions exists without applied pressure or vacuum.

A simplified schematic of a typical mud system is shown in FIG. 1. A derrick 2 is located over a wellbore 4. A work string 6 located within the wellbore 4 enables the circulation of drilling fluid flow (indicated by arrows) through a flow path that includes the work string 6, out the bottom of the work string 6a and up the annulus 10 between the work string 6 and the wellbore 4. The drilling fluid is pumped by mud pump 14 and flows through the mud line 8a prior to entering the work string 6. The drilling fluid exits the wellbore 4 via return mud line 8b and flows to the mud pit 12. At least a portion of the mud is directed to a fluid processing unit(s) 16, which can include various items such as a shale shaker and/or one or more centrifuge, which can remove formation cuttings 17 from the drilling fluid. Typically, the mud from the return mud line 8b will pass through a shale shaker before it is returned to the mud pit 12. Separated formation cuttings 17 can then be contained in a cuttings box 18 for further treating or removal.

The fluid processing unit(s) 16 may include, but is not limited to, one or more of a shaker (e.g., shale shaker), a centrifuge, a hydro-cyclone, a separator (including magnetic and electrical separators), a desilter, a desander, a filter (e.g., diatomaceous earth filters), a heat exchanger, any fluid reclamation equipment and combinations thereof that can change a characteristic of the fluid. The fluid processing unit(s) 16 may further include one or more sensors, gauges, pumps, compressors, and the like used to store, monitor, regulate, and/or recondition the drilling fluid. The primary characteristics that the fluid processing unit(s) 16 can alter are the contained solids and density of the drilling mud. Typically, the more advanced fluid processing unit(s) 16 such as a centrifuge, a hydro-cyclone, a desilter, a desander, etc. will draw mud from the active pit 12, clean it and then return the cleaned mud back into the active pit 12.

In an embodiment, the fluid processing unit(s) 16 includes at least one centrifugal separator, such as a hydro-cyclone or a centrifuge. The centrifugal separator can comprise a plurality of centrifugal separators to achieve a desired capacity of drilling fluid flow and effectiveness of solids removal.

Figure 2:
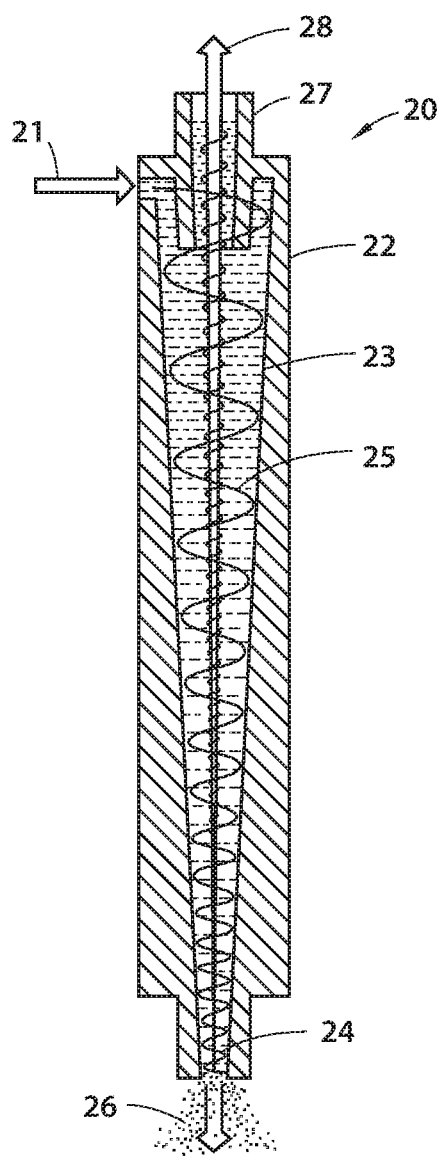
FIG. 2 is a representative example of the structure of a hydro-cyclone, shown in cross-section.

Referring now to FIG. 2, one embodiment of a hydro-cyclone 20 is illustrated. The basic operating principle of a hydro-cyclone 20 is centrifugal force. Fluid containing solid particulates 21 is fed tangentially into the body 22 of the hydro-cyclone 20. The inner wall 23 of the body 22 of the hydro-cyclone 20 is in the shape of a cone with a smaller open end or spigot 24 of the cone shape oriented downward. The tangentially fed fluid 21 into the body 22 of the hydro-cyclone causes a vortex fluid flow 25. Internally of the induced vertex fluid flow 25, the centrifugal force is countered by the resistance of the fluid, with the effect that relatively larger or denser solid particulates tend to be thrown to the inner wall 23 of the body 22 and to be discharged by gravity from the spigot 24 with a small amount of fluid as underflow 26. Most of the fluid containing relatively fine solid particulates discharges from the upper end of the body 22 of the hydro-cyclone 20 via the vortex finder 27 as overflow 28.

The underflow 26 of fluid from the spigot 24 of the hydro-cyclone body 20 tends to contain particles coarser than the cut point size. The overflow 28 of fluid from the upper end of the hydro-cyclone body 22 tends to contain relatively finer particles finer than the cut point size. The overflow 28 from the hydro-cyclone 20 can then continue through a system or method for further treatment.

The "cut point size" of a hydro-cyclone is a measure of the efficiency in removing particles of a particular size. As used herein, for example, the term "d50 cut point" refers to the particle size at which the hydro-cyclone is 50% efficient at removing particles. The number of hydro-cyclones used, their size and operating conditions and respective cut point size are variable and will be based on the specific conditions of the drilling fluid to be processed.

While a hydro-cyclone may have advantages, based on the sizes, throughput capacity, and economics of such centrifugal separation equipment, other types of centrifugal separators may be employed. For example, a centrifuge may likewise be employed as a centrifugal separator in certain embodiments and situations.

Figure 3:
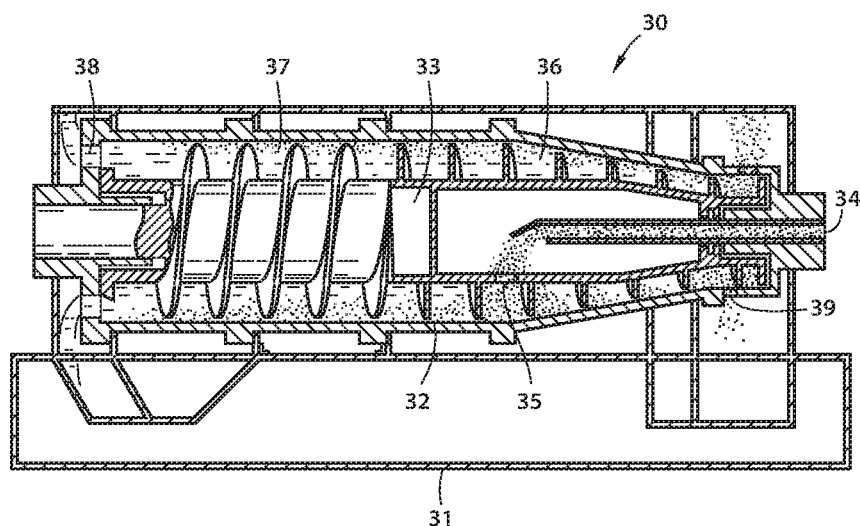
FIG. 3 is a representative example of the structure of a centrifuge, shown in cross-section.

Referring now to FIG. 3, a centrifuge 30 is illustrated. The basic operating principle of a centrifuge 30 is centrifugal force. The centrifuge 30 is shown supported horizontally on a frame 31. A centrifuge 30 can be either horizontal or vertical. The body of the centrifuge defines a generally cylindrical wall 32, and a screw-type conveyor 33. A fluid is fed into inlet 34, with a flow path through an opening in the conveyor 33 to the space between the conveyor 33 and the cylindrical wall 32, which space is sometimes referred to as the bowl of the centrifuge. The rotation of the conveyor helps separate the particulate from the fluid in a region 36 known as the drying zone and fluid with a reduced particulate content moves through a liquid zone 37 toward an outlet 38. The removed particulate is expelled through the outlet 39.

One of the most well-known guiding principal in drilling solids removal is Stokes' law. This law determines many things including the efficiency of hydro-cyclones and centrifuges, why a barite particle and a drilling solid settle at different rates for comparable sizes, and many other things. Stokes' law for the settling of spherical particles in a viscous liquid can be seen below.

$$V_s = \frac{CgD_E^2(\rho_s - \rho_L)}{\mu}$$

where:
 $V_S$=Settling or terminal velocity, in ft/sec
 C=Units constant, 2.15×10⁻⁷
 g=Acceleration (gravity or apparatus), in ft/sec²
 $D_E$=Particle equivalent diameter, microns
 $\rho_s$=Specific gravity of solids
 $\rho_L$=Specific gravity of the liquid phase
 µ=Viscosity of media, centipoise The premise of the present disclosure is the introduction and mixing of a liquefied gas, such as for example, carbon dioxide, pentane or butane, into the mud system before it enters a solids separator such as a centrifuge or hydro-cyclone. The liquefied gas lowers the apparent viscosity of the media µ, thus increasing the settling velocity as per Stokes' law. The solids can be removed from the mixture and the remaining mixture, having reduced solids content, will enter a gas recovery device that will remove the liquefied gas through a process such as vaporization. The liquefied gas can either be soluble or insoluble in the continuous phase of the drilling fluid. Illustrative embodiments of the process can be seen as block flow diagrams in FIGS. 4-8.

Figure 4:
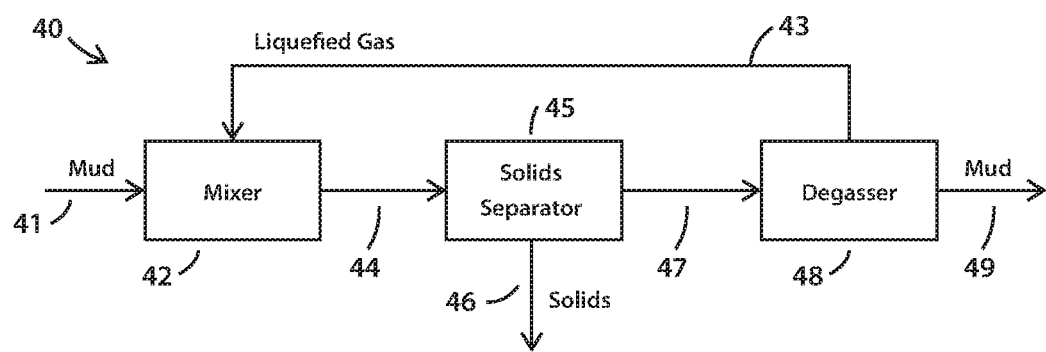
FIG. 4 is a process flow diagram for an embodiment of the present disclosure.

Referring to FIG. 4, a method of treating a drilling mud 40 is shown having an untreated mud 41 entering a mixer 42. The mixer 42 combines the untreated mud 41 with a liquefied gas 43 to produce a mixed stream 44. The mixed stream 44 flow path enters the solids separator 45, such as a centrifuge or hydro-cyclone, producing a stream containing solids 46 and a partially processed stream 47 having reduced solids content. The partially processed stream 47 having reduced solids content then enters a degasser 48 where a stream of liquefied gas 43 is removed and a processed mud stream 49 is ready for reuse in the drilling process. The degasser 48 may vaporize the liquefied gas to remove it from the cleaned mud necessitating a compressor or other device to re-liquefy the gas before it is added back into the mud feed. In an embodiment, the degasser 48 can include the steps of vaporizing the gas from the fluid stream and liquefying the gas back into a liquid for reuse.

The introduction of the liquefied gas will reduce the density and viscosity of the drilling fluid similar to dilution to increase the solid separators efficiency in accordance with Stokes' law. The advantage of using a liquefied gas over dilution is the gas can be recovered and reused. This can save costs in raw materials and reduce the amount of space required to store the raw materials.

After the majority of the liquefied gas is recovered, even if the gas is not completely removed from the mud system, its residual effects on the mud system's properties will be negligible. This potential for residual effect is the primary cause of concern with using certain chemicals.

This process has potential to be placed on a rig with two centrifuges during drilling operations. Both of the centrifuges can benefit from the decreased viscosity and density of the mud-gas mixture. Illustrative embodiments can be seen as block flow diagrams in FIGS. 5-8.

Figure 5:
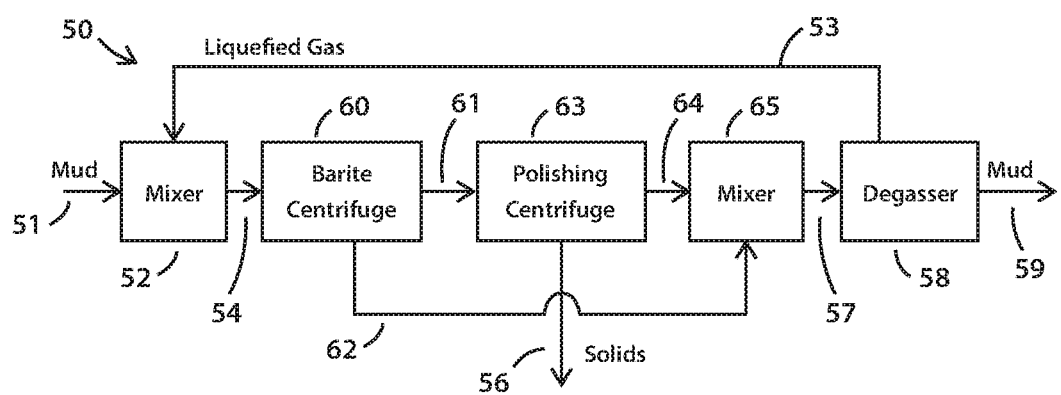
FIG. 5 is a process flow diagram for an embodiment of the present disclosure.

Referring to FIG. 5, a method of treating a drilling mud 50 is shown having an untreated mud 51 flow path entering a mixer 52. The mixer 52 combines the untreated mud 51 with a liquefied gas 53 to produce a mixed stream 54. The mixed stream 54 enters the first solids separator 60, such as a barite centrifuge, producing a stream containing the removed barite 62 and a partially processed stream 61 having reduced barite content. The partially processed stream 61 having reduced barite content then enters a second solids separator, such as a polishing centrifuge 63 producing a stream containing the removed solids 56 and a partially processed stream 64 having reduced barite content and reduced solids content that enters mixer 65. The mixer 65 combines the partially processed stream 64 having reduced barite content and reduced solids content with the stream containing the removed barite 62 to make a recombined stream 57 that has a reduced solids content with a restored barite content 57. The recombined stream 57 then enters a degasser 58 where a stream of liquefied gas 53 is removed and a processed mud stream 59 is ready for reuse in the drilling process.

Figure 6:
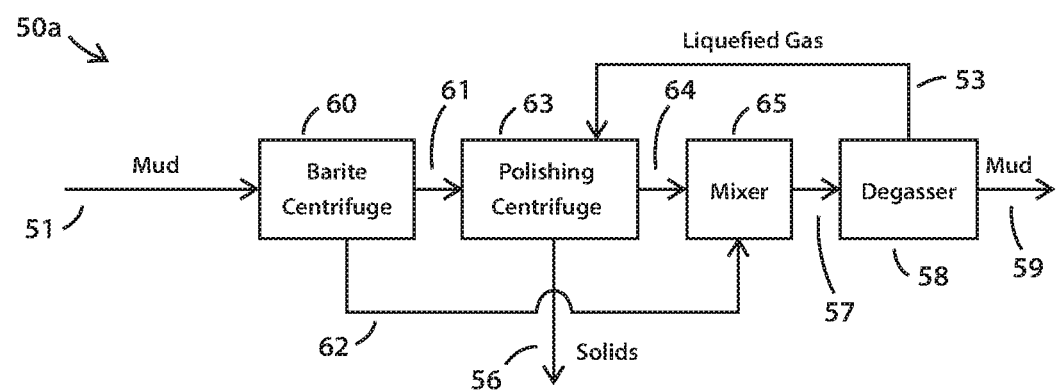
FIG. 6 is a process flow diagram for an embodiment of the present disclosure.

It is also possible to only mix the liquefied gas 53 with the feed 61 going into the polishing centrifuge 63. This would reduce issues with pumping the barite slurry and would decrease the viscosity and density of the mud when removing solids is the hardest (the polishing centrifuge). This embodiment is shown in FIG. 6 wherein a method of treating a drilling mud 50a is shown having an untreated mud 51 entering a first solids separator 60, such as a barite centrifuge, producing a stream containing the removed barite 62 and a partially processed stream 61 having reduced barite content. The partially processed stream 61 having reduced barite content then enters a second solids separator, such as a polishing centrifuge 63, along with a liquefied gas stream 53. The second solids separator 63 produces a stream containing the removed solids 56 and a partially processed stream 64 having reduced barite content and reduced solids content that enters mixer 65. The mixer 65 combines the partially processed stream 64 having reduced barite content and reduced solids content with the stream containing the removed barite 62 to make a recombined stream 57 that has a reduced solids content with a restored barite content 57. The recombined stream 57 then enters a degasser 58 where a stream of liquefied gas 53 is removed and a processed mud stream 59 is ready for reuse in the drilling process.

Figure 7:
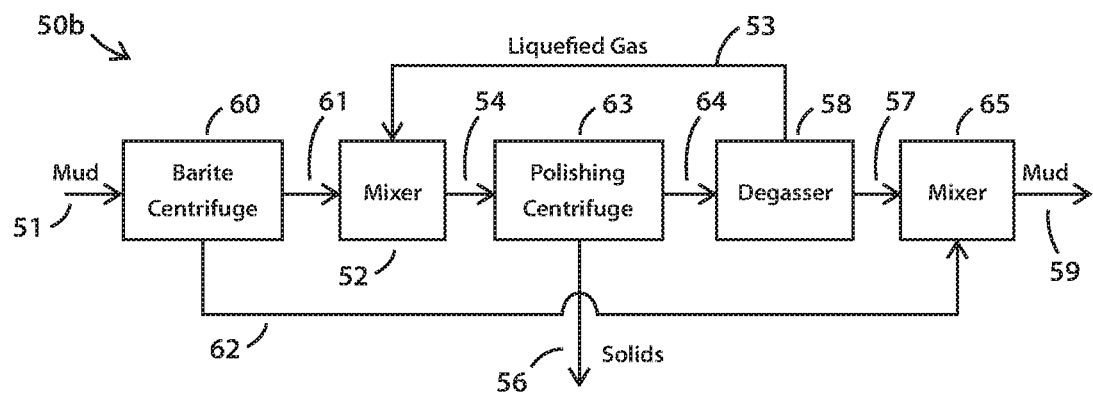
FIG. 7 is a process flow diagram for an embodiment of the present disclosure.

A still further embodiment is shown in FIG. 7 wherein a method of treating a drilling mud 50b is shown having an untreated mud 51 entering a first solids separator 60, such as a barite centrifuge, producing a stream containing the removed barite 62 and a partially processed stream 61 having reduced barite content. The partially processed stream 61 having reduced barite content then enters a mixer 52 wherein the liquefied gas stream 53 is combined with the partially processed stream 61 to produce a mixed stream 54 that enters a second solids separator, such as a polishing centrifuge 63. The second solids separator 63 produces a stream containing the removed solids 56 and a partially processed stream 64 having reduced barite content and reduced solids content. The partially processed stream 64 then enters a degasser 58 where a stream of liquefied gas 53 is removed and a partially processed mud stream 57 that is essentially degassed. The partially processed mud stream 57 then enters mixer 65. The mixer 65 combines the partially processed stream 57 having reduced barite content and reduced solids content with the stream containing the removed barite 62 to make a processed stream 59 that has a reduced solids content with a restored barite content. The processed mud stream 59 is ready for reuse in the drilling process.

An additional configuration is adding a treatment to the stream containing the removed solids to dry them to an acceptable level for disposal and returning recovered oil to the mud system and recycling the liquefied gas. An illustrative embodiment of this configuration can be seen as a block flow diagram in FIG. 7.

Figure 8:
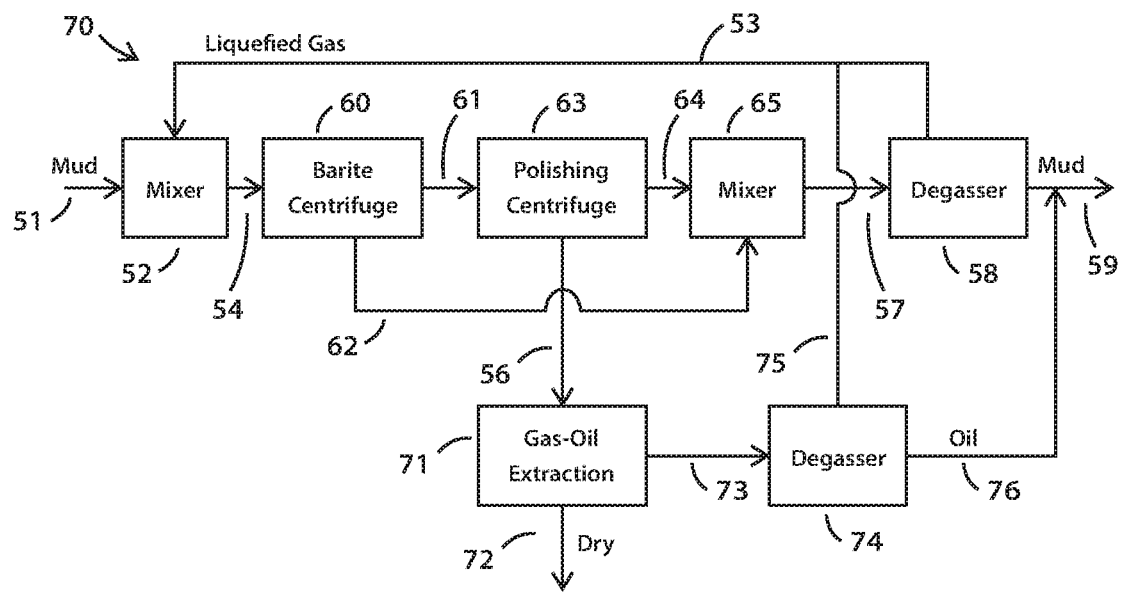
FIG. 8 is a process flow diagram for an embodiment of the present disclosure.

Referring to FIG. 8, a method of treating a drilling mud 70 is shown having an untreated mud 51 entering a mixer 52. The mixer 52 combines the untreated mud 51 with a liquefied gas 53 to produce a mixed stream 54. The mixed stream 54 enters the first solids separator 60, such as a barite centrifuge, producing a stream containing the removed barite 62 and a partially processed stream 61 having reduced barite content. The partially processed stream 61 having reduced barite content then enters a second solids separator, such as a polishing centrifuge 63 producing a stream containing the removed solids 56 and a partially processed stream 64 having reduced barite content and reduced solids content that enters mixer 65. The mixer 65 combines the partially processed stream 64 having reduced barite content and reduced solids content with the stream containing the removed barite 62 to make a recombined stream 57 that has a reduced solids content with a restored barite content 57. The recombined stream 57 then enters a degasser 58 where a stream of liquefied gas 53 is removed and a processed mud stream 59 is ready for reuse in the drilling process. The stream containing the removed solids 56 then enters a gas-oil extraction unit 71 that separates entrained oil and gas from the removed solids. The removed solids exit in a dry stream 72 which is suitable for disposal. Any oil and gas recovered in the gas-oil extraction unit 71 are transferred via line 73 into a second degasser 74 that separates the products into a gas stream 75 and an oil stream 76. The gas stream 75 can be comingled with the liquefied gas 53 for recycle back to the first mixer 52. The oil stream 76 can be mixed into the processed mud stream 59 for reuse in the drilling process.

As set forth above, the embodiments of the present disclosure provide a method for extracting a solid material with the aid of a gas in the liquid or the supercritical state. In some embodiments, the extraction process is performed continuously. The process can involve the receipt of a feed nominally at atmospheric pressure and optionally at any pressure above that required to maintain a liquid state of the gas at the nominal operating temperature. In some embodiments, the feed can be delivered at a pressure equal to or greater than that required to have the gas exist in the liquid phase. The feed can be pressurized before exposure to the gas.

The materials being removed by these methods can include a wide range of material, solid and/or semi-solid, including but not limited to, geological matter (e.g., drill cuttings), metal cuttings, and materials used in the drilling process such as lost circulation material. Geological matter includes drill cuttings, for example, from hydrocarbon exploration, including tar sands and oil shale processing.

Suitable gases for use in the present methods and systems include any gas that can be employed as a liquid or supercritical gaseous agent. Typically, the solvent gas for use in the present methods and systems will be a vapor at or near ambient temperature conditions (e.g., about 20-30° C.) and be a liquid at the conditions of the centrifugal separator.

Suitable gases of use in the present systems and methods include, without limitation, gaseous oxides including carbon dioxide and nitrous oxide; alkanes including methane, ethane, propane, n-butane, isobutane, pentane, hexane; alkenes including ethylene, propylene, n-butene and isobutene; alkynes including ethene; ethers including dimethyl ether and diethyl ether; esters including ethyl acetate; halogenated compounds including sulfur hexafluoride, chlorofluorocarbons such as trichlorofluoromethane, dichlorofluoromethane, difluorochloromethane, and fluorocarbons including trifluoromethane; and elemental liquefied gases including xenon and nitrogen and other liquefied compressed gases known to the art. In some embodiments, the solvent gas is selected from the group consisting of butane, isobutane, isobutene, propane, carbon dioxide, dimethyl ether, methane, ethane, nitrous oxide, propylene, ethylene, sulfur hexafluoride, ammonia, gaseous hydrocarbons, gaseous halogenated hydrocarbons, fluorocarbons, and mixtures thereof.

In an embodiment, the drilling fluid to be processed can be first subjected to super-ambient pressures before exposure to or mixing with the supercritical or liquid phase gas. In some embodiments, the feed is first mixed with the supercritical or liquid phase gas and then subject to super-ambient pressures.

One of several schemes can be used to deliver the drilling fluid containing solid material into the extraction process. Any pump that is suitable for increasing the pressure of the feed from atmospheric pressure to a super-ambient pressure sufficient for the liquefied gas can be used and can include piston pumps, peristaltic pumps, progressive cavity pumps, concrete pumps, and/or diaphragm pumps. The disclosed pumps are meant to illustrate that such pumps can be used to increase the pressure of the solid feed, and are not meant to limit the embodiments to any one specific pump type.

In an embodiment, the drilling fluid and liquefied gas may need to be well-mixed (i.e., mixed to homogeneity) prior to entry into the centrifugal separator. While this could be done in a batch mixing tank, it is generally preferred that an in-line mixing device be used. Suitable devices include a passive device, including a static mixer, or an active device, including an in-line mixer or an in-line blender. The disclosed mixing devices are meant to illustrate that such devices can be used and are not meant to limit the embodiments to any one specific mixing device type.

The residual gas should be removed from the extracted solids and the material must be lowered in pressure (or in some cases heated and/or lower pressure). It is also desirable that the gaseous solvent content in the discharged solid be sufficiently low that the residual gas (e.g., butane, propane, hydrocarbons, and/or dimethyl ether) is well below the lower flammability limit for the material as defined by the National Fire Protection Agency (NFPA). Removal of residual gas from the discharged solids can be done using any method known in the art. If particulate solid is friable or fragile, as would be the case with drill cuttings, tar sands, oil shale, then removal of residual solvent from the discharged the solids can be done in a step-wise batch release through a series of pressure vessels.

An embodiment of the disclosure is a method of extracting and separating solid particulates from a drilling fluid includes combining a stream of drilling fluid containing solid particulates with a liquefied gas to form a mixture having a reduced viscosity, density, or both. The mixture enters a centrifugal separator at a pressure sufficient to keep the liquefied gas in a liquid phase where rotational forces promote the separation of at least a portion of the solid particulates from the mixture. At least a portion of the solid particulates are removed to form a fluid stream having reduced solids content. In embodiments the liquefied gas can be selected from the group consisting of an inert gas, an alkane gas, an alkene gas, an alkyne gas, a noble gas, and combinations thereof. The liquefied gas can be removed from the fluid stream after the centrifugal separator and recycled back to be mixed with the stream of drilling fluid containing solid particulates. The separation from the fluid stream can include vaporizing the liquefied gas and separating the liquefied gas from the fluid stream to form a stream of vaporized gas. The method can include re-liquefying the vaporized gas to form a stream of liquefied gas, which can be subsequently recycled and mixed with the incoming drilling fluid.

An embodiment can further include a second centrifugal separator placed in series with and located after the first centrifugal separator. The first centrifugal separator removes a first group of solids, the second centrifugal separator removes a second group of solids, and at least a portion of the first group of solids is mixed back into the liquid stream after the removal of the second group of solids. In an embodiment, the first centrifugal separator is a barite centrifuge that removes barite from the drilling fluid prior to the second centrifugal separator that removes undesirable solid particulates. The barite is then able to be reintroduced into the drilling fluid. In an optional embodiment, the liquefied gas is added to the drilling fluid after the removal of the first group of solids and prior to the second centrifugal separator. In an optional embodiment, the liquefied gas is added to the drilling fluid prior to both the first centrifugal separator and the second centrifugal separator.

In an embodiment, the removed solids contain some residual gas or oil and the residual gas or oil is extracted to form a dried solid particulate. The extracted residual gas can be recycled back into the untreated drilling fluid, while the extracted residual oil can be added back into the treated drilling fluid.

An alternate embodiment is a method of extracting and separating solid particulates from a drilling fluid composition that includes combining a first drilling fluid containing solid particulates with a liquefied gas to form a second drilling fluid having a reduced viscosity, density, or both, the liquefied gas in either a supercritical or liquid phase. Passing the second drilling fluid into a centrifugal separator while maintaining pressure in the centrifugal separator sufficient to keep the liquefied gas in a liquid phase. Rotating the centrifugal separator to promote the separation of at least a portion of the solid particulates from the second drilling fluid, thereby separating at least a portion of the solid particulates from the second stream to form a third drilling fluid having reduced solids content. Vaporizing the liquefied gas and separating the liquefied gas from the drilling fluid to form vaporized gas and a degassed drilling fluid, re-liquefying the vaporized gas to form a liquefied gas and mixing the liquefied gas with the first drilling fluid. The liquefied gas can be selected from the group consisting of an inert gas, an alkane gas, an alkene gas, an alkyne gas, a noble gas, and combinations thereof. In an optional embodiment the centrifugal separator includes a first centrifugal separator and a second centrifugal separator in series, whereby the first centrifugal separator removes a first group of solids, the second centrifugal separator removes a second group of solids, and at least a portion of the first group of solids is mixed back into the drilling fluid after the removal of the second group of solids. The first centrifugal separator and second centrifugal separator can be set in series and both operate at conditions to maintain the liquefied gas in a liquid or supercritical phase.

An alternate embodiment is a method of extracting and separating solid particulates from a drilling fluid composition using multiple centrifugal separators, the method including combining a first drilling fluid containing solid particulates with a liquefied gas to form a second drilling fluid having a reduced viscosity, density, or both, the liquefied gas being in either a supercritical or liquid phase and selected from the group consisting of an inert gas, an alkane gas, an alkene gas, an alkyne gas, a noble gas, and combinations thereof. The second drilling fluid is introduced into a first centrifugal separator while maintaining pressure in the first centrifugal separator sufficient to keep the liquefied gas in a liquid phase. Rotating the first centrifugal separator promotes the separation of at least a portion of the solid particulates from the second drilling fluid to form a third drilling fluid having reduced solids content. Then passing the third drilling fluid into a second centrifugal separator while maintaining pressure in the second centrifugal separator sufficient to keep the liquefied gas in a liquid phase and rotating the second centrifugal separator to promote the separation of at least a portion of the solid particulates from the third drilling fluid, thereby separating at least a portion of the solid particulates from the third drilling fluid to form a fourth drilling fluid having reduced solids content. At least a portion of the removed solid particulates from the second drilling fluid can be mixed into the fourth drilling fluid. The removed solid particulates from the second drilling fluid may consist essentially of barite, which is desirable to remain in the drilling fluid. The liquefied gas can be vaporized and separated from the drilling fluid to form a degassed drilling fluid. The vaporized gas can be re-liquefied and can be combined with the liquefied gas for mixing with the first drilling fluid. Residual gas and oil can be extracted from the removed solids. The extracted gas can be combined with the vaporized gas for recycle back into the system while the extracted oil can be added into the degassed drilling fluid.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of extracting and separating solid particulates from a drilling fluid composition comprising:
   contacting a first drilling fluid containing solid particulates with a liquefied gas to form a second drilling fluid exhibiting one or more properties that are reduced compared to the same property exhibiting by the first drilling fluid, wherein the one or more properties are selected from viscosity, density, and combinations thereof;
   introducing the second drilling fluid into a first centrifugal separator, wherein the first centrifugal separator is operated at a first pressure sufficient to maintain the liquefied gas present in the second drilling fluid in a liquid phase;
   rotating the first centrifugal separator to promote separation of at least a portion of the solid particulates from the second drilling fluid; and
   removing at least a portion of the solid particulates from the second drilling fluid to form a third drilling fluid having reduced solids content compared to the second drilling fluid.

2. The method of claim 1, wherein the liquefied gas is in either a supercritical or liquid phase while in the second drilling fluid.

3. The method of claim 1, wherein the liquefied gas is selected from the group consisting of an inert gas, an alkane gas, an alkene gas, an alkyne gas, a noble gas, and combinations thereof.

4. The method of claim 1, further comprising removing the liquefied gas from the third drilling fluid to form a degassed drilling fluid having reduced solids content as compared to the first drilling fluid.

5. The method of claim 4, further comprising vaporizing the liquefied gas present in the third drilling fluid to form vaporized gas and separating the vaporized gas from the remaining components present in the third drilling fluid.

6. The method of claim 5, further comprising re-liquefying the vaporized gas to form the liquefied gas for contact with the first drilling fluid.

7. The method of claim 1, further comprising a second centrifugal separator in series with and located after the first centrifugal separator, wherein the first centrifugal separator removes a first group of solids to form the third drilling fluid, the second centrifugal separator removes a second group of solids to form a fourth drilling fluid, and at least a portion of the first group of solids is mixed back into the fourth drilling fluid to form a fifth drilling fluid.

8. The method of claim 7, wherein the first centrifugal separator is a centrifuge that removes barite from the second drilling fluid prior to the second centrifugal separator that removes undesirable solid particulates.

9. A method of extracting and separating solid particulates from a drilling fluid composition comprising:
   contacting a first drilling fluid containing solid particulates with a liquefied gas to form a second drilling fluid exhibiting one or more properties that are reduced compared to the same property exhibiting by the first drilling fluid, wherein the one or more properties are selected from viscosity, density, and combinations thereof;
   introducing the second drilling fluid into a first centrifugal separator, wherein the first centrifugal separator is operated at a first pressure sufficient to maintain the liquefied gas present in the second drilling fluid in a liquid phase;
   rotating the first centrifugal separator to promote separation of at least a portion of the solid particulates from the second drilling fluid;
   removing at least a portion of the solid particulates from the second drilling fluid to form a third drilling fluid having reduced solids content compared to the second drilling fluid; and
   removing the liquefied gas from a fourth drilling fluid after a second centrifugal separator to form a degassed drilling fluid having reduced solids content as compared to the first stream of drilling fluid.

10. The method of claim 9, further comprising recycling the liquefied gas removed after the second centrifugal separator to be mixed with the first drilling fluid.

11. The method of claim 9, further comprising recycling the liquefied gas removed after the second centrifugal separator to be mixed with the third drilling fluid after the removal of the first group of solids and prior to the second centrifugal separator.

12. The method of claim 7, wherein the liquefied gas is mixed with the second and third drilling fluid streams prior to both the first centrifugal separator and the second centrifugal separator.

13. The method of claim 7, further comprising: extracting residual gas and oil from the second group of solids.

14. The method of claim 13, further comprising: separating the residual gas from the residual oil, combining the residual gas with the liquefied gas, and combining the residual oil with a degassed drilling fluid.

15. A method of extracting and separating solid particulates from a drilling fluid composition comprising:
   combining a first drilling fluid containing solid particulates with a liquefied gas in either a supercritical or liquid phase to form a second drilling fluid exhibiting one or more properties that are reduced compared to the same property exhibiting by the first drilling fluid, wherein the one or more properties are selected from viscosity, density, and combinations thereof;

introducing the second drilling fluid into a centrifugal separator, wherein the centrifugal separator is operated at a pressure sufficient to maintain the liquefied gas present in the second drilling fluid in a liquid phase;

rotating the centrifugal separator to promote separation of at least a portion of the solid particulates from the second drilling fluid;

removing at least a portion of the solid particulates from the second drilling fluid to form a third drilling fluid having reduced solids content compared to the first drilling fluid;

vaporizing the liquefied gas and separating the vaporized gas from the third drilling fluid to form a degassed drilling fluid;

re-liquefying the vaporized gas to form the liquefied gas to be combined with the first drilling fluid.

16. The method of claim 15, wherein the liquefied gas is selected from the group consisting of an inert gas, an alkane gas, an alkene gas, an alkyne gas, a noble gas, and combinations thereof.

17. The method of claim 15, wherein the centrifugal separator comprises a first centrifugal separator and a second centrifugal separator in series, wherein the first centrifugal separator removes a first group of solids, the second centrifugal separator removes a second group of solids, and at least a portion of the first group of solids is mixed back into the third drilling fluid after the removal of the second group of solids.

18. The method of claim 17, wherein the first centrifugal separator and second centrifugal separator in series both operate at conditions to maintain the liquefied gas in a liquid or supercritical phase.

19. A method of extracting and separating solid particulates from a drilling fluid composition using multiple centrifugal separators, the method comprising:

combining a first drilling fluid containing solid particulates with a liquefied gas selected from the group consisting of an inert gas, an alkane gas, an alkene gas, an alkyne gas, a noble gas, and combinations thereof, to form a second drilling fluid exhibiting one or more properties that are reduced compared to the same property exhibiting by the first drilling fluid, wherein the one or more properties are selected from viscosity, density, and combinations thereof;

introducing the second drilling fluid into a first centrifugal separator, wherein the first centrifugal separator is operated at a pressure sufficient to maintain the liquefied gas present in the second drilling fluid in a liquid phase;

rotating the first centrifugal separator to promote separation of at least a portion of the solid particulates from the second drilling fluid;

removing at least a portion of the solid particulates from the second drilling fluid to form a third drilling fluid having reduced solids content compared to the first drilling fluid;

introducing the third drilling fluid into a second centrifugal separator, wherein the second centrifugal separator is operated at a pressure sufficient to maintain the liquefied gas present in the third drilling fluid in a liquid phase;

rotating the second centrifugal separator to promote the separation of at least a portion of the solid particulates from the third drilling fluid;

separating at least a portion of the solid particulates from the third drilling fluid to form a fourth drilling fluid having reduced solids content;

mixing at least a portion of the solid particulates removed from the second drilling fluid with the fourth drilling fluid to form a fifth drilling fluid;

vaporizing the liquefied gas and separating the vaporized gas from the fifth drilling fluid to form a degassed drilling fluid;

re-liquefying the vaporized gas to form re-liquefied gas;

combining at least a portion of the re-liquefied gas with the first drilling fluid;

extracting residual gas and oil from the solid particulates removed from the third drilling fluid;

separating the residual gas and oil to form a residual gas stream and residual oil stream;

combining the residual gas stream with the vaporized gas, and combining the residual oil stream with the degassed drilling fluid.

* * * * *